United States Patent [19]

Berntsen

[11] 4,332,016
[45] May 25, 1982

[54] METHOD, APPARATUS AND TRANSDUCER FOR MEASUREMENT OF DIMENSIONS

[75] Inventor: Robert G. Berntsen, Asker, Norway

[73] Assignee: A/S Tomra Systems, Asker, Norway

[21] Appl. No.: 114,156

[22] Filed: Jan. 22, 1980

[30] Foreign Application Priority Data

Jan. 26, 1979 [NO] Norway ................................. 790270
Jan. 26, 1979 [NO] Norway ................................. 790271

[51] Int. Cl.³ ............................................ G01S 15/89
[52] U.S. Cl. ........................................ 367/7; 367/103;
367/104; 73/628; 73/642
[58] Field of Search ............... 367/103, 104, 151, 107,
367/113, 115, 7; 73/597, 618, 619, 628, 629,
633, 634, 641, 642; 343/7, 9

[56] References Cited

U.S. PATENT DOCUMENTS

| | | | |
|---|---|---|---|
| 3,243,768 | 3/1966 | Roshon, Jr. et al. | 367/151 |
| 3,262,307 | 7/1966 | Hart | 73/629 |
| 3,380,293 | 4/1968 | Murphy | 367/113 X |
| 3,792,423 | 2/1974 | Becker et al. | 343/7.9 X |
| 3,854,327 | 12/1974 | Felix | 73/584 |
| 3,912,954 | 10/1975 | Baird | 367/151 |
| 3,918,025 | 11/1975 | Koshikawa et al. | 367/7 |
| 3,960,007 | 6/1976 | Swensen | 73/629 |

FOREIGN PATENT DOCUMENTS

| | | |
|---|---|---|
| 1211306 | 3/1968 | United Kingdom . |
| 1291849 | 10/1972 | United Kingdom . |
| 1512242 | 4/1975 | United Kingdom . |

*Primary Examiner*—Richard A. Farley

*Attorney, Agent, or Firm*—Nolte and Nolte

[57] ABSTRACT

A method, a device and a transducer for dimensional measurement of objects by means of ultrasonics, where the objects are carried past at least an ultrasonic measuring device consisting of a combined transmitter/receiver or separate transmitter/receiver. The reflected ultrasonic signals are used to determine characteristic three-dimensional dimensions of the objects. Said device or devices are arranged either such that the ultrasonic beam or beams therefrom are provided with a reciprocating movement which substantially crosses the direction of movement of the objects or by letting the ultrasonic beam or beams therefrom be stationary. The delay of the reflected signals is used to form a three dimensional image of the object by means of a computer, said image being compared with known images for identification. The ultra sonic measuring device has a narrow, substantially rotation-symmetric radiation diagram. The ultra sonic radiation is directed downwards towards the conveying path through provision of means arranged above and at a distance from the objects to be measured. The transducer uses air as propogation medium and is arranged at a distance from the objects to be dimensionally measured. The transducer consists of an electro-acoustic oscillator arranged coaxially with the centerline of a substantially conical ultrasonic reflector, the angle of aperture of the reflector relative to the center line through the reflector being equal to 45°. The transducer provides ultrasonics having a wavelength in the range of 0.1 to 5 mm, preferably 1.1 to 1.4 mm.

4 Claims, 11 Drawing Figures

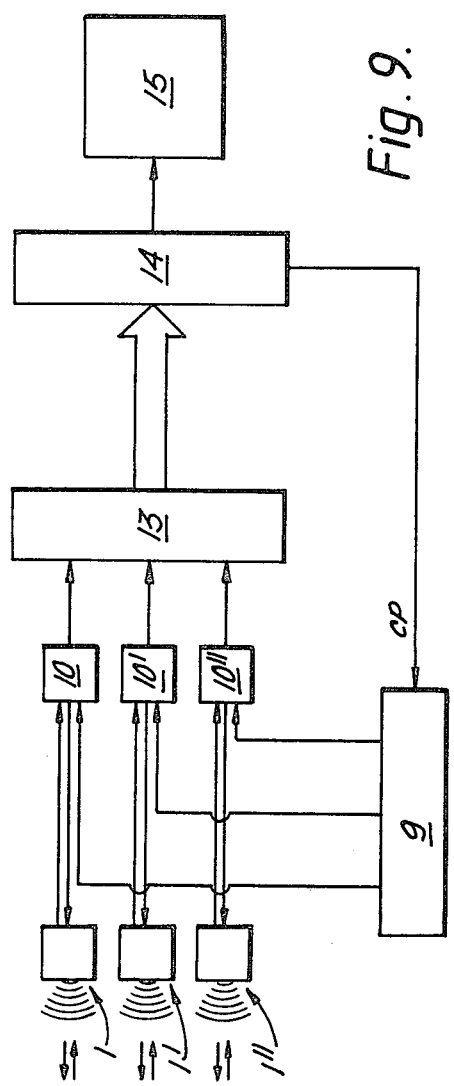
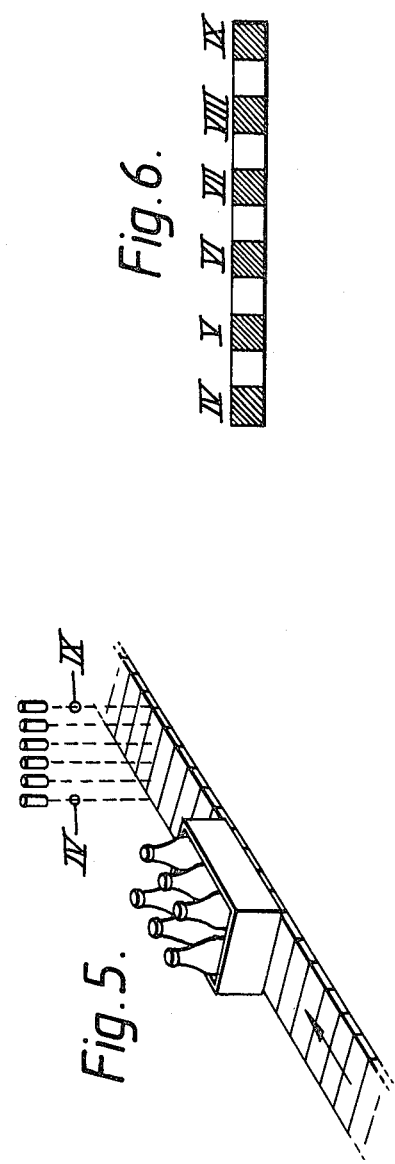
Fig. 9.
Fig. 6.
Fig. 5.

METHOD, APPARATUS AND TRANSDUCER FOR MEASUREMENT OF DIMENSIONS

The present invention relates to a method, an apparatus and a transducer for measurement of dimensions by means of ultrasonics, and more specifically measurement of objects which are moved past at least one ultrasonic measuring device consisting of combined transmitter/receiver or separate transmitter/receiver.

There are previously known a number of methods and devices for measurement of dimensions, in particular for detection of irregularities and cracks in objects and for measurement of wall thicknesses of hollow tubes and the like. Such devices are known inter alia from U.S. Pat. No. 3,228,233 and German Offenlegungsschrift No. 2,363,356. The said devices are constructed in particular with regard to the cross-section of the object they are to measure, and the electro-acoustic transducers are therefore preferably arranged radially relative to the centre line of the object.

From British Pat. No. 1,226,987 it is known a device for distance measurement or a so-called ultrasonic micrometer. Its use for measurement of dimensions is however very limited due to the accurate focusing which must take place.

British Pat. No. 1,391,903 relates to an ultrasonic scanning apparatus in order to form a two-dimensional image, in particular for medical use. The known apparatus has its ultrasonic beam directed substantially in a helical path in order to provide the best possible continuous and uniform scanning.

The present invention has an object to provide a three-dimensional measurement of objects, in particular liquid containers such as e.g. bottles with or without content.

The ultrasonic transducer according to the present invention is simple and inexpensive to produce, exhibits a narrow, rotation-symmetric radiation pattern and is suitable e.g. for three-dimensional measurement of objects as defined above, but will also be suitable for other purposes where it is desirable to have a narrow, preferably rotation-symmetric radiation pattern.

The characterizing features of the present invention will appear from the claims hereinafter and the description below with reference to the drawings illustrating as examples preferred embodiments of the present invention.

FIG. 1 is a first embodiment of the invention for measurement of dimensions using ultrasonic transducers.

FIG. 2 indicates covering area of the transducers used in FIG. 1.

FIG. 5 is a modification of the embodiments of FIGS. 1 and 3, the transducers being stationary.

FIG. 6 illustrates the covering area of each of the transducers in FIG. 5.

FIG. 9 illustrates as an example a block diagram of a circuit for determination of the type of the detected object.

The wavelength range of the emitted ultrasonic signals is as an example in the range of 1.1-1.4 mm. There will thus inherently be obtained a very satisfactory measurement resolution.

Figure 1:
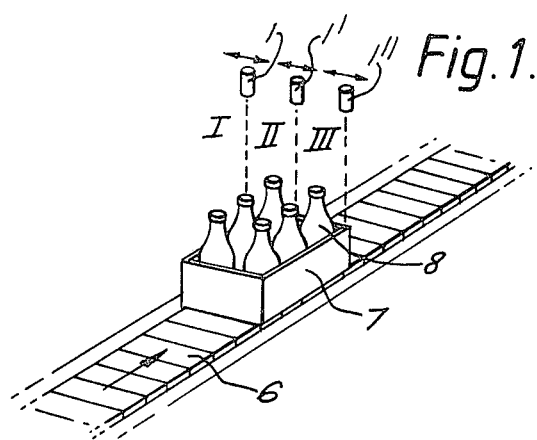
Figure 2:
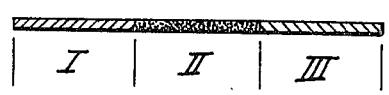

In FIG. 1 there is shown, solely as an example, three transducers 1, 1', 1" having the radiation reflector facing downwards. The said transducers may be given a reciprocating synchronized movement so that the emitted beam from each of the transducers covers a respective area I, II, and III.

Alternatively, the transducers may be stationary as shown in FIG. 5, each having a covering area as shown in FIG. 6. It is here illustrated as an example a total of six transducers with respective covering areas IV, V, VI, VII, VIII and IX.

Figure 3:
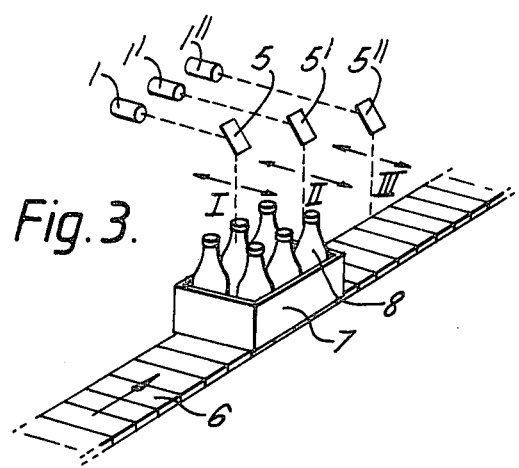
FIG. 3 is a modification of the embodiment of FIG. 1, the transducers being stationary and the beams from these being reflected by means of movable reflectors.
Figure 4:
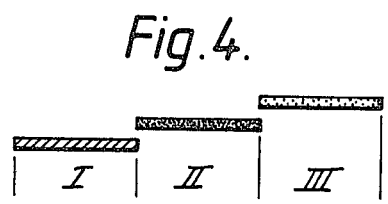
FIG. 4 illustrates the covering area of each of the transducers in FIG. 3.

In the examples shown, which not in any way are limitary on the use of the invention, a carton 7 with bottles 8 is fed on a conveyor 6. It is thereby provided a possibility to measure the outer and inner dimensions as well as length of the crate 7 and further the largest outer dimension, the dimension of the bottle neck mouth and the internal depth of each respective bottle. The reciprocating movement of the transducers 1, 1' and 1" in FIG. 1 may be provided e.g. by mounting the transducers on a common frame which is reciprocated by means of eccentric drive means. FIG. 3 is a modification of the embodiment of FIG. 1, the transducers 1, 1', 1" being positioned horizontally so that the emitted beam from each transducer extends horizontally and strikes an inclined reflector 5, 5', 5", respectively. In a similar manner as for the transducers of FIG. 1, the reflectors or mirrors 5, 5', 5" may be provided with a synchronized reciprocating movement so that the reflected beams cover respective areas I, II, III, as indicated in FIG. 4. The conveyor 6 as shown in FIGS. 1, 3 and 5 may be of any suitable type.

Figure 7:
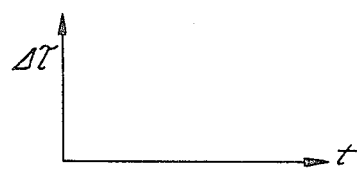
FIG. 7 illustrates as an ideal example detection of the dimensions of a liquid container, e.g. a bottle.
Figure 7:
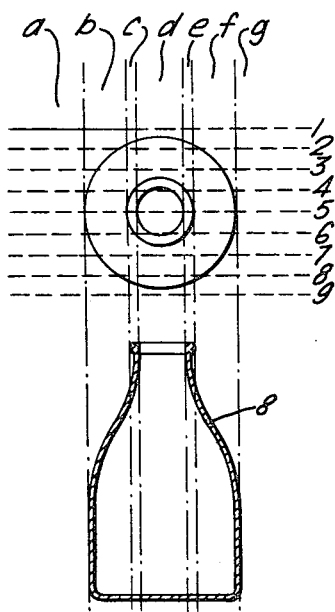
Figure 8:
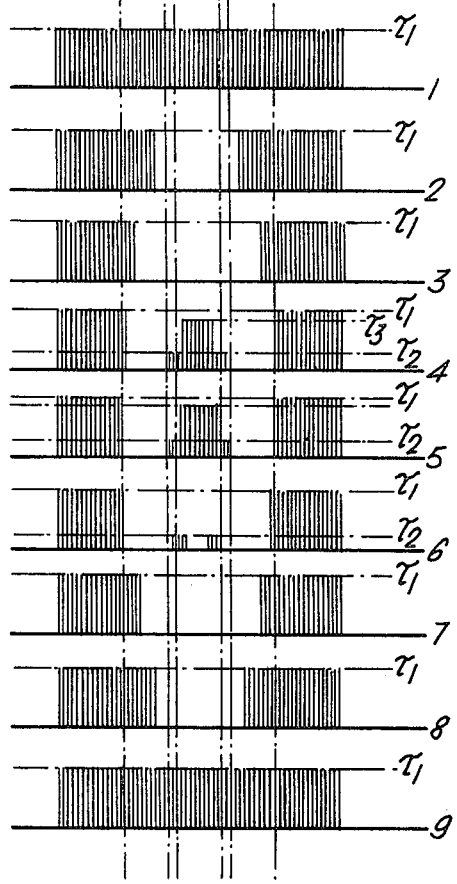
FIG. 8 is a diagram representing the delay of readable return signal relative to the sweep time of the transducer.

In FIG. 7 there is as an example shown measurement of a bottle, the beam from the transducer 1 travelling in number of successive paths 1, 2, 3, 4, 5, 6, 7, 8, 9. The detection intervals may coarsely be subdivided as illustrated by the intervals a, b, c, d, e, f, g. In order to more easily understand the invention, it is here considered that the bottle 8 is moved slowly on the conveyor, the transducer being assumed to move rapidly across the conveyor. FIG. 8 illustrates a diagram with delay of readable return signal as function of sweep time. During sweep no. 1 the delay of the return signal is constant and equal to $\tau_1$ for all the intervals from a to g. In reality the delay $\tau_1$ will represent the level of the conveyor relative to the transducer. During sweep no. 2 the beam hits the bottle at the end of interval b and leaves the bottle at the beginning of interval f. The beams hitting the bottle will however only be reflected by faces which are normal to the direction of radiation, and no readable return signal will therefore be obtained during the middle interval. Similar results are obtained for the sweeps nos. 3, 7 and 8, respectively. During sweep no. 4, the beam hits the bottle at the beginning of interval b, but during interval b and f the beam is reflected away from the bottle and there is therefore no return signal present. When the beam hits the mouth of the bottle, the delay of the readable return signal is recorded as $\tau_2$, and in the middle of the interval d the beam hits the bottom of the bottle and the delay of the return signal is here represented by $\tau_3$. The corresponding relationship is also true for sweep no. 5, whereas during sweep no. 6 there is no longer registered any return signal from the bottom of the bottle. The sweeps nos. 7 and 8 are substantially corresponding to sweeps nos. 2 and 3 above, whereas sweep no. 9 corresponds to sweep no. 1 above. The expert will immediately appreciate that the said delay conveniently may be converted into pulse form by letting the delay be registered as a pulse train.

It will immediately be understood that as regards the embodiment of FIG. 5, a similar discussion as for FIGS. 7 and 8 may be carried out. Instead of a sweeping transducer, there are in FIG. 5 e.g. six transducers which are stationary.

In FIG. 9 there is as an example shown a block diagram of a circuit for dimensional measurement of objects, e.g. bottles. Reference is directed to FIGS. 7 and 8 in order to elucidate the invention, but the expert will immediately appreciate that the invention not in any way is limited to dimensional measurement of bottles. The expert will also immediately see that the circuit of FIG. 9 may easily be modified for measurement of other objects than e.g. bottles.

In FIG. 9 there is used, as in the examples of FIGS. 3 and 5, three transducers 1, 1' and 1''. It is however possible to use less or more transducers by minor modification of the circuit in FIG. 9. The reference numeral 9 indicates a signal generator controlled by a clock pulse cp. The signal generator has preferably a frequency in the range of 20 kHz.–5 MHz, and in a preferred embodiment the range 220–250 kHz. This provides wavelengths in the range 1.0–1.5 mm. The signals from the signal generator are feed through respective gates 10, 10', 10'' to respective transducers 1, 1',1'' from which the radiation takes place as previously described. The return signals from the respective transducers are fed through said respective gates 10, 10', 10'' to a signal correlator and convertor 13. The registered delay times are transfered to a computing means 14 for further processing. In the computer 14 there is created a three-dimensional image of the object, e.g. the bottle, which image is compared with known images for identification. On the basis of the comparison carried out in said computer, further information is submitted to the unit 15, which unit may represent a display means or a printing means for indication of e.g. refund value of the registered bottle, or control-system for further transportation of the objects or means for further handling of the object, e.g. putting on labels or a price tags etc.

Figure 10:
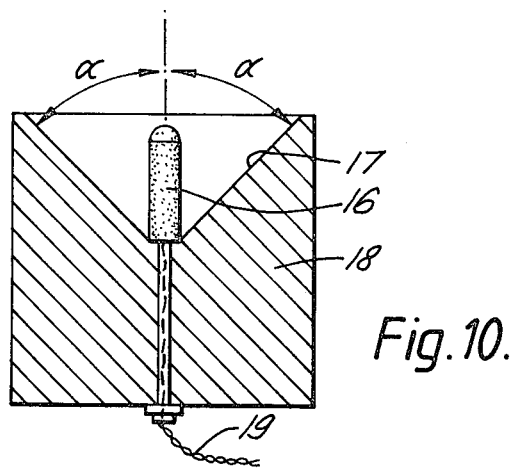
FIG. 10 is an electro-acoustic transducer according to the invention.

FIG. 10 illustrates an ultrasonic tranducer consisting of a cylindrical piezo-electric converter/oscillator 16. The converter 16 is mounted in a housing 18 which is substantially cylindrical and provided with a radiation reflective portion 17 which is funnel shaped and rotation-symmetrical with an aperture angle relative to the centre-line through the convertor 16, said angle in a prefered embodiment of the invention being equal to 45°. Electrical supply to the converter 16 is through wires 19.

The illustrated embodiment of the transducer provides a very advantageous radiation pattern, which will appear from FIG. 11 and from table I below.

TABLE I.

| Left (dB) | Degrees | Right (dB) |
| --- | --- | --- |
| 0 | 0 | 0 |
| −2.2 | 1 | −2.2 |

TABLE I.-continued

| Left (dB) | Degrees | Right (dB) |
| --- | --- | --- |
| −11.1 | 2 | −9.5 |
| −13 | 3 | −13 |
| −9.5 | 4 | −9.5 |
| −13 | 5 | −13 |
| −23.5 | 6 | −21 |
| −18.2 | 7 | −17.5 |
| −19 | 8 | −20 |
| −25 | 9 | −25 |
| −25 | 10 | −23.5 |

Figure 11:
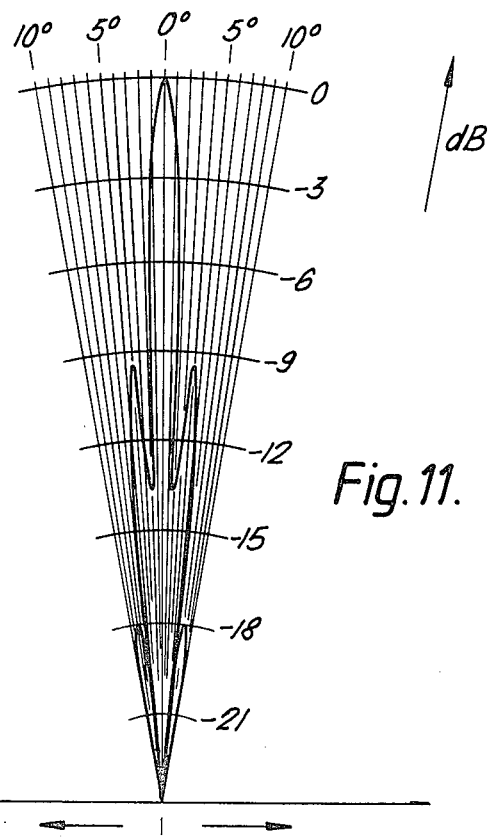
FIG. 11 illustrates the radiation pattern of the electro-acoustic transducer according to the invention.

As will appear from FIG. 11, the radiation pattern is narrow and substantially rotation-symmetrical.

Within the scope of the following claims, it will immediately be understood that modifications of the invention and its embodiments may easily be provided.

I claim:

1. A method for dimensional measurement of objects by means of ultrasonic signals, said objects being carried past at least one ultrasonic measurement device consisting of a transmitter/receiver, characterized in that the reflected ultrasonic signals are used to determine the characteristic 3-dimensional dimensions of the objects by converting the delay of the reflected signals into corresponding distances and using the distances to form a 3-dimensional image of the object by means of a computer means and that image being compared with known images for identification, and that said ultrasonic measurement device is arranged such that the beams of ultrasonic signals therefrom are subjected to a reciprocating movement substantially traversing the direction of movement of the objects.

2. A method for dimensional measurement of objects by means of ultrasonic signals, the objects being carried past at least one ultrasonic measuring device consisting of a transmitter/receiver, characterized in that the ultrasonic signals reflected by the objects are used to determine characteristic three dimensional dimensions of the objects by converting the delay of the reflected signals into corresponding distances and using the distances to form a three-dimensional image of the object by means of a computer means and that image being compared with known images for identification, the beams of ultrasonic signals from said device being stationary.

3. An apparatus for dimensional measurement of objects by means of ultrasonic signals, where the objects are carried past at least one ultrasonic measuring device consisting of a transmitter/receiver, characterized in that the ultrasonic measuring device has a narrow substantially rotation-symmetrical radiation pattern and the ultrasonic radiation being directed downwards towards the conveying path through the provision of radiation direction means arranged above and at a distance from the objects to be measured as regards dimensions, said radiation direction means being provided by at least one reflecting element having a reciprocating synchronized movement relative to the path of movement of the object, said reflecting element by reflection deflecting the beam of ultrasonic signals from said device.

4. An apparatus for dimensional measurement of objects by means of ultrasonic signals, where the objects are carried past at least one ultrasonic measuring device consisting of a transmitter/receiver, characterized in that the ultrasonic measuring device has a narrow substantially rotation-symmetrical radiation pattern and the ultrasonic radiation being directed downwardly toward the conveying path through the provision of radiation direction means arranged above and at a distance from the objects whose dimensions are to be measured, said radiation direction means being constituted by said device and having a reciprocating synchronized movement relative to the path of movement of the objects.

* * * * *